United States Patent
Que

(10) Patent No.: US 10,120,225 B2
(45) Date of Patent: Nov. 6, 2018

(54) LIQUID CRYSTAL DISPLAY DEVICE HAVING ENCLOSURE SNUGLY ENGAGED WITH DISPLAY PANEL

(71) Applicant: Shenzhen China Star Optoelectronics Technology Co., Ltd., Shenzhen, Guangdong (CN)

(72) Inventor: Chengwen Que, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/635,255

(22) Filed: Jun. 28, 2017

(65) Prior Publication Data

US 2017/0299914 A1  Oct. 19, 2017

Related U.S. Application Data

(63) Continuation-in-part of application No. 14/437,819, filed on Apr. 22, 2015, now abandoned.

(51) Int. Cl.
*G02F 1/1333* (2006.01)

(52) U.S. Cl.
CPC .......... *G02F 1/133308* (2013.01); *G02F 2001/13332* (2013.01); *G02F 2001/133317* (2013.01);
(Continued)

(58) Field of Classification Search
CPC .......... G02F 1/133308; G02F 2201/46; G02F 2001/133317; G02F 1/1333;
(Continued)

(56) References Cited

U.S. PATENT DOCUMENTS

2002/0125815 A1* 9/2002 Wakita .............. G02F 1/133308
 313/491
2004/0179150 A1* 9/2004 Lai .................... G02F 1/133308
 349/58
(Continued)

FOREIGN PATENT DOCUMENTS

CN 102809836 A * 12/2012 ....... G02F 1/133308
CN 203350562 U * 12/2013

OTHER PUBLICATIONS

English translation of CN 102809836 A, Title: Borderless LCD device, Author: Yu Gang; Yang Liuyang; Jia Pei; Date of publication: Dec. 5, 2012.*
English translation of CN 203350562 U, Title: Novel limit block of LCD (Liquid Crystal Display) panel ; Author: The Inventor Has Waived the Right to Be Mentioned ; Date of publication: Dec. 18, 2013.*

*Primary Examiner* — Edward Glick
*Assistant Examiner* — Shan Liu
(74) *Attorney, Agent, or Firm* — Andrew C. Cheng

(57) ABSTRACT

A liquid crystal display panel comprises an enclosure configured with a bezel frame which includes a lateral wall and a bezel attached to the lateral wall. A substrate with a leading edge defines at least of a positioning slot corresponding to the resilient tab, and a display panel module with optical components is supported on the substrate. A space is defined under the bezel with at least one resilient tab extending into the space. Wherein when the leading edge of the substrate is inserted into the space, interengagement is created between the resilient tab and the positioning slot.

9 Claims, 5 Drawing Sheets

(52) U.S. Cl.
CPC ...... *G02F 2201/46* (2013.01); *G02F 2201/56* (2013.01); *G02F 2202/28* (2013.01)

(58) Field of Classification Search
CPC ........ G02F 2001/133354; G02F 2001/133314; G02F 1/133608; G02F 2001/133311; G02F 2001/13332; G02F 2001/133322; G02F 2001/133325; G02F 2001/133328; G02F 2001/133331; G02F 2001/133334; G02F 1/133305; G02F 1/136277; G02F 2001/133302; G02F 2001/133368; G02F 2201/56; H01L 27/12; H01L 27/1203; H01L 27/1218; H01L 21/02367
USPC .............................................. 349/58–60, 158
See application file for complete search history.

(56) References Cited

U.S. PATENT DOCUMENTS

| | | | | |
|---|---|---|---|---|
| 2004/0201791 | A1* | 10/2004 | Peng | G02F 1/133308 349/58 |
| 2004/0219857 | A1* | 11/2004 | Fujishiro | G02F 1/133308 445/23 |
| 2013/0149482 | A1* | 6/2013 | Kuo | G02F 1/1333 428/58 |
| 2015/0362787 | A1* | 12/2015 | Yuan | G02F 1/133308 349/58 |

* cited by examiner

LIQUID CRYSTAL DISPLAY DEVICE HAVING ENCLOSURE SNUGLY ENGAGED WITH DISPLAY PANEL

CROSS REFERENCE TO RELATED APPLICATIONS

This is a continuation-in-part application of co-pending patent application Ser. No. 14/437,819, filed on Apr. 22, 2015, entitled "LIQUID CRYSTAL DEVICE, THE BORDER AND THE LIQUID CRYSTAL PANEL THEREOF", which is a national stage of PCT Application Number PCT/CN2014/090019, filed on Oct. 31, 2014, claiming foreign priority of Chinese Patent Application Number 201410567956.X, filed on Oct. 22, 2014.

BACKGROUND OF THE INVENTION

Field of the Invention

The present invention relates to an enclosure, and especially to an enclosure used in liquid crystal display device. The enclosure is configured with a bezel frame and a base frame, and at least a pair of resilient prongs configuring a resilient dovetail-shaped tab in the bezel frame to snugly and efficiently inter-engage with a corresponding dovetail-shaped retaining gap defined in an edge of a substrate.

Related Arts

With the growing competition of the liquid crystal display devices, it is more and more important to come out with differentiated designs. For instance, super thin and narrowed frame is one of the trends in design liquid crystal display device.

As shown in FIG. 1, the super thin/narrow frame LCD 10 includes a front frame 1, a liquid crystal panel 2, a plurality of optical components 4, and a base frame 5. The front frame 1 includes a bezel 6 for pressing the liquid crystal panel 2 via buffering components so as to shield an end portion 7 of the liquid crystal panel and to position the liquid crystal panel 2 therein. The front frame 1 further includes a lateral wall 8 perpendicular to the bezel 6. The front frame 1 is attached to the lateral wall 8 through screws or equivalents.

As the above-mentioned trend, the bezel 6 may increase the thickness (H) of the liquid crystal panel 2, while the lateral wall 8 may increase the thickness (D), which is detriment to the super thin and narrowed design.

CN 102809836A issued to Jia et al., US Pat Publication No 2002/0125815 submitted by Wakita, and CN203350562U all disclose related designs.

SUMMARY OF THE INVENTION

It is an object of the present invention to provide a novel frame configuration in which a retaining gap is defined under a bezel portion of the frame so as to snugly receive a substrate of a display panel in a way that an upper surface of the display panel is flushed to a top surface of the bezel so as to reach a compact, thin and narrowed design of liquid crystal display device.

According to one aspect of the present invention, the retaining gap is provided with at least of resilient prongs configuring a dovetail-shaped tab, and an edge of the substrate is defined with a dovetail-shaped positioning slot corresponding to the dovetail-shaped tab. When the edge of the substrate is inserted and retained within the retaining gap of the frame, an interference interengagement is created between the dovetail-shaped tab and the dovetail-shaped positioning slot.

DETAILED DESCRIPTION OF THE PREFERRED EMBODIMENTS

Embodiments of the invention will now be described more fully hereinafter with reference to the accompanying drawings, in which embodiments of the invention are shown.

Figure 1:
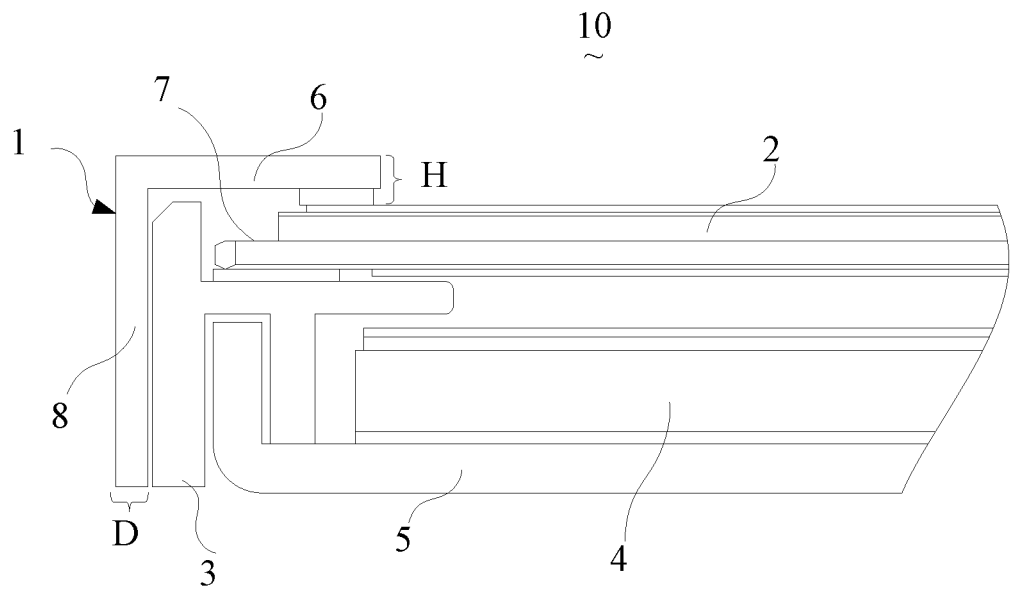
FIG. 1 is a cross section view of a conventional liquid crystal display (LCD).
Figure 2:
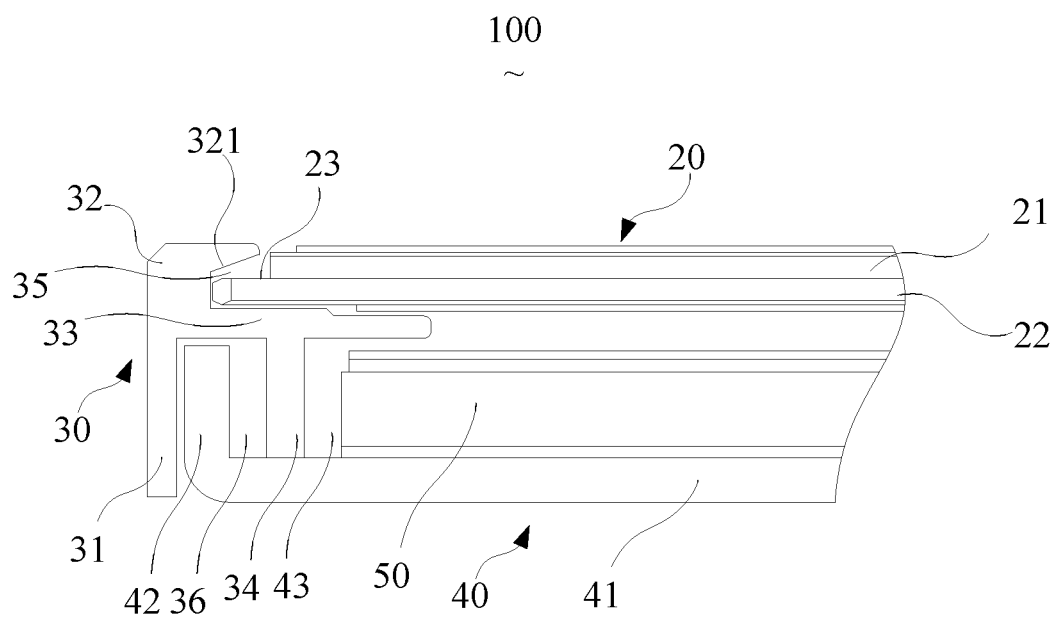
FIG. 2 is a partial cross sectional view of the LCD made in accordance with a first embodiment of the present invention.

Referring to FIG. 2, a partial cross sectional view of the LCD made in accordance with a first embodiment of the present invention is shown. The liquid crystal display device 100 includes a liquid display panel module 20, a bezel fame 30, a base frame 40, and an optical component 50. The bezel frame 30 and the base frame 40 jointly configure into an enclosure to house the liquid display panel module 20 and the optical components 50.

The bezel frame 30 is configured with a lateral wall 31, a bezel 32, a supporting platform 33, and a mounting portion 34. The bezel 32 extends from a top end of the lateral wall 31. In this embodiment, the supporting platform 32 extends also from the lateral wall 31 and jointly define a retaining gap 35 with the bezel 32. The bezel 32 is preferably formed with a lead-in surface 321. The mounting portion extends downward from the supporting platform 32. The mounting portion 34 is in parallel with respect to the lateral wall 31 such that a retaining trough 36 is defined therebetween.

The liquid crystal display panel module 20 includes a thin-film transistor (TFT) substrate 22 and a color filter (CF) substrate 21 mounted on top of the TFT substrate 22 which is larger than the CF substrate 21 in dimension. A lead-in edge 23 is spared in the liquid crystal display panel module 20 and which can be readily inserted into the retaining gap 35 in a way such that a top surface of the liquid crystal display panel module 20 is flushed with a top surface of the bezel 32. The TFT substrate 22 is defined with a gluing area, and the arrangement of the supporting platform 33, the lead-in surface 321 of the bezel 32 can be readily used to control the flowing direction of the glue in that gluing area. Specially, the lead-in surface 321 will preferably lead the glue to flow out of the retaining gap 35 and settle in an area between the CF substrate 21 and the lead-in surface 321 of the bezel 32.

The base frame 40 includes a bottom wall 41, a first peripheral wall 42 extending upward from the bottom wall 41. A mounting space 43 is defined by the bottom wall 41, the first peripheral wall 42 and the supporting platform 33 for housing the optical components 50 therebetween. The first peripheral wall 42 is properly fitted into the retaining trough 36 defined between the lateral wall 31 and the mounting portion 34 so as to keep all elements in correct and intended positions. It should be noted that the mounting portion 34 can be omitted and replaced by the first peripheral wall 42 and the supporting platform 33.

Figure 3:
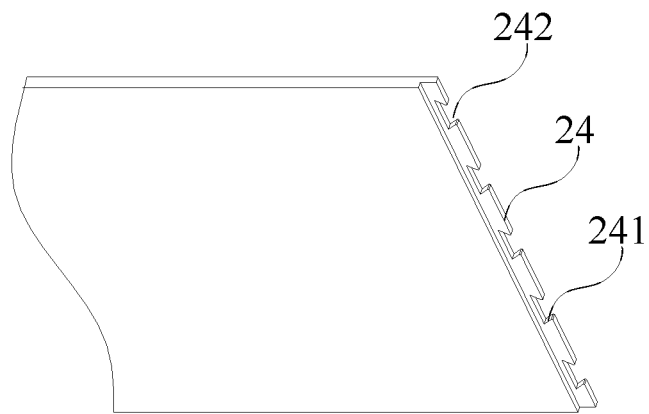
FIG. 3 is a partial, perspective view of FIG. 2.
Figure 7:
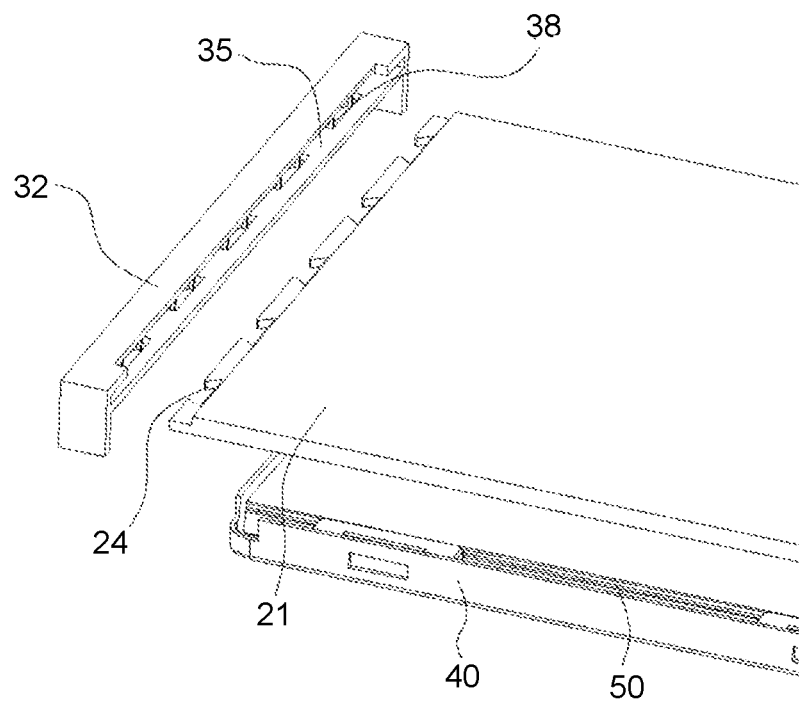
FIG. 7 is an illustrational view showing the display module is assembling toward the frame.
Figure 8:
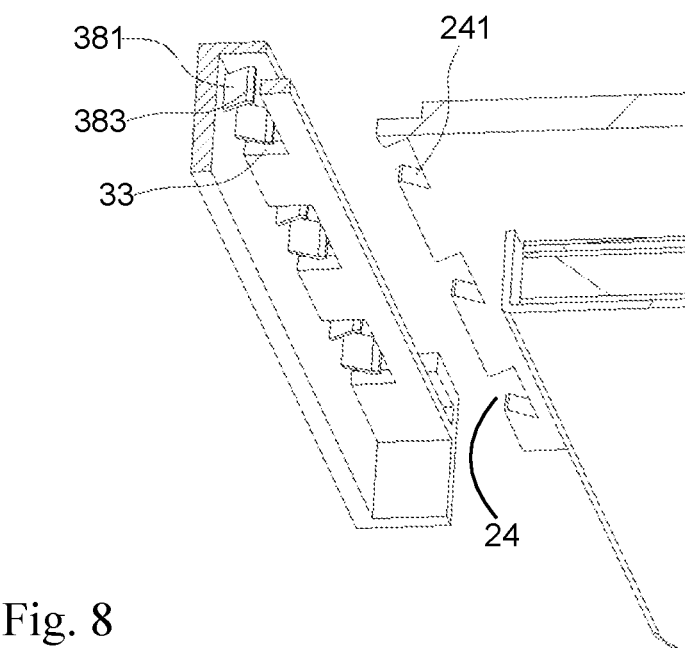
FIG. 8 is similar to FIG. 7, while viewing from bottom direction.
Figure 9:
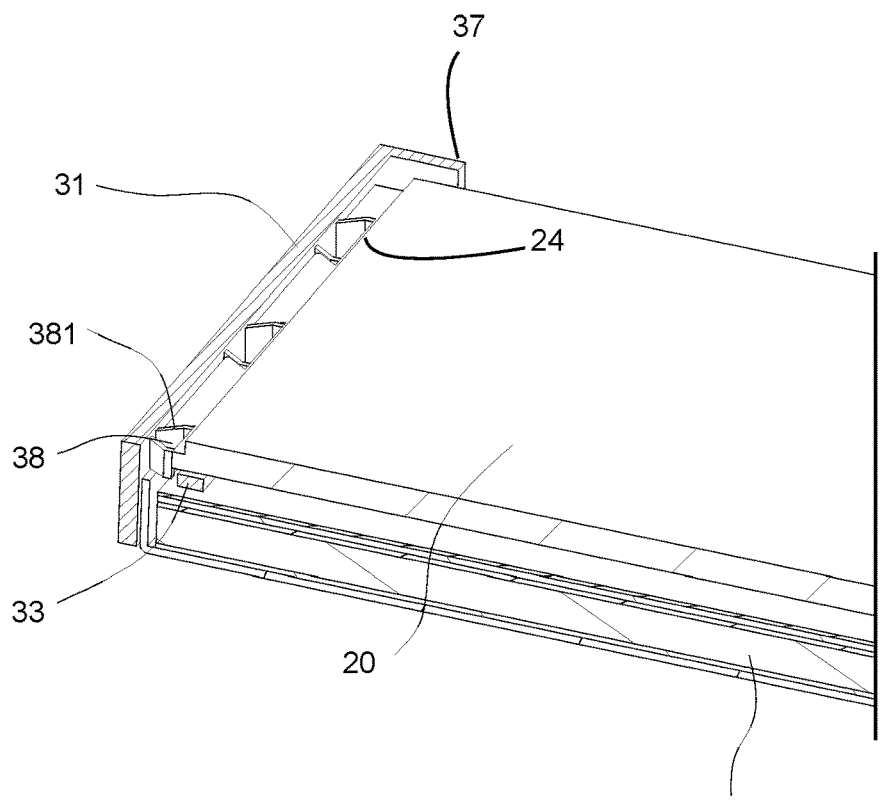
FIG. 9 is an illustration view with the bezel removed to illustrate the engagement between the dovetail-shaped tabs and the dovetail-shaped positioning slots.
Figure 10:
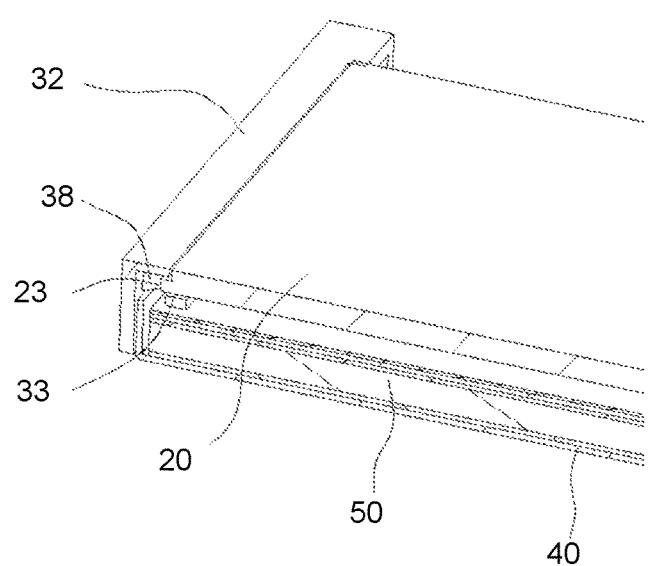
FIG. 10 is a partial and perspective view showing the compete assembly.

Referring now to FIG. 3, along with FIGS. 7, 8 and 9, the lead-in edge 23 of the TFT substrate 22 is defined with a plurality of positioning slots 24 jointly defined by a pair of inclined surfaces 241 therein. The positioning slot 24 has a dovetail-shaped configuration, i.e. having a narrow mouth, while a larger pocket therein.

Figure 4:
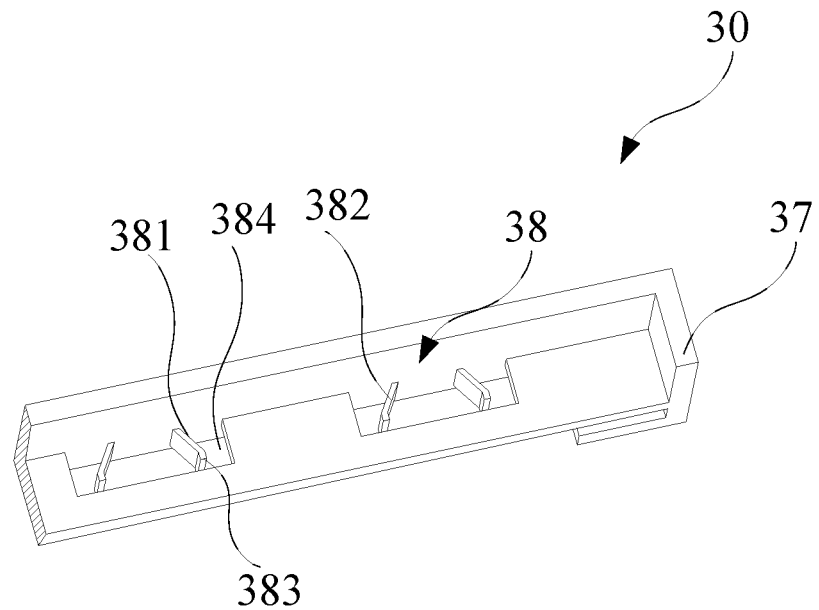
FIG. 4 is a partial, perspective view of the frame of FIG. 2, viewing from bottom of the frame.

Referring to FIG. 4, again along with FIGS. 7, 8, 9 and 10. It should be noted that FIG. 4 is viewed from a bottom direction, i.e. a direction opposite to the bezel 32. A plurality of resilient tabs 38 extends from the lateral wall 31 into the retaining gap 35. An end wall 37 is connected to the end of the lateral wall 31. The end wall 37, the bezel 32 and the supporting platform 33 are integrally formed together.

The resilient tab 38 is configured by a first prong 381 and a second prong 382. Each of the first and second prongs 381, 382 is defined with a lead-in 383. The first and second prongs 381, 382 extend from the lateral wall 31 into the retaining gap 35 so as to meet and engage with the positioning slot 24 of the lead-in edge 23 of the TFT substrate 22. Every two adjacent resilient tabs 38 jointly a receiving space 384. The interengagement between the resilient tabs 38 and the positioning slots 24 can be readily appreciated by the disclosure of FIG. 9. Since both the resilient tabs 38 and the positioning slots 24 are configured into the dovetail-shaped, as a result, a reliable and compact interengagement therebetween can be ensured and benefited. The arrangement of the lead-in 383 will ensure the engagement smooth and easy. As any skilled in the arts can readily appreciate the convenience of this arrangement, it is believed that no detailed description is needed.

Figure 5:
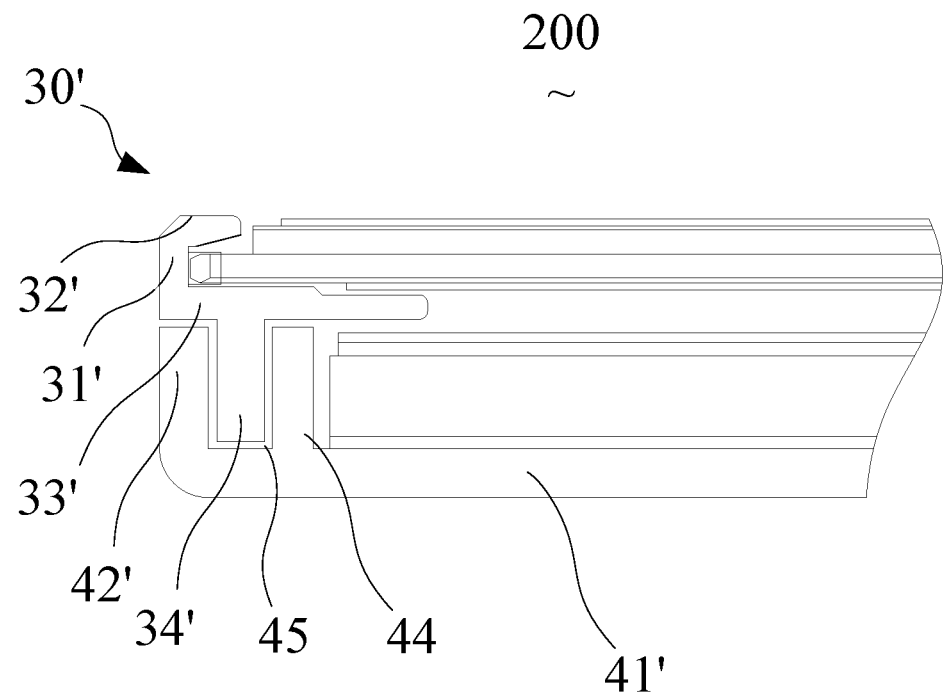
FIG. 5 is a partial cross sectional view of the LCD in accordance with a second embodiment of the present invention.

Referring to FIG. 5, a partial cross sectional view of the LCD in accordance with a second embodiment of the present invention is disclosed.

The liquid crystal display device 200 is substantially similar to the liquid crystal display device 100. The difference resides the engagement or assembly between the bezel frame 30' and the base frame 40'. In this embodiment, the base frame 40' is formed with a second peripheral wall 44 and jointly defining a mounting trough 45 along with the first peripheral wall 42' so as to securely receive the mounting portion 34' of the bezel frame 30'.

It can be readily appreciated from FIG. 5 as in this embodiment, the lateral wall 31' is also flushed with the first peripheral wall 42. The lateral wall 31' can be shortened as the mounting portion 34' is snugly positioned within the mounting trough 45.

It should be noted that the lateral wall 31', the supporting platform 33' and the mounting portion 34 can be made individually, and then assembled together; or alternatively, they can be integrally formed.

Figure 6:
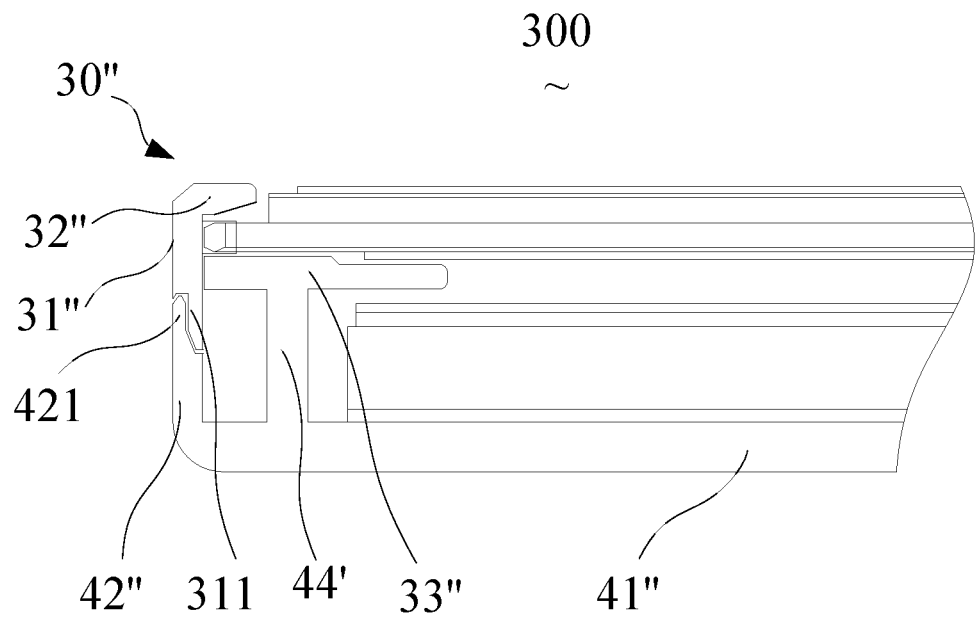
FIG. 6 is a partial cross sectional view of the LCD in accordance with a third embodiment.

Referring to FIG. 6, a partial cross sectional view of the LCD in accordance with a third embodiment of the present invention is disclosed.

The liquid crystal display device 300 is substantially similar to the liquid crystal display device 200. The difference again resides the engagement or assembly between the bezel frame 30" and the base frame 40".

In this embodiment, the supporting platform 33" is integrally formed with the base frame 40" while extending upward to define the retaining gap 35 (see FIG. 2 for reference), i.e. the supporting platform 33" is integrally formed with the second peripheral wall 44'. In addition, the lateral wall 31' is aligned with the first peripheral wall 42".

In this embodiment, the base frame 40' is formed with a second peripheral wall 44 and jointly defining a mounting trough 45 along with the first peripheral wall 42' so as to securely receive the mounting portion 34' of the bezel frame 30'. Both the lateral wall 31" and the first peripheral wall 41" is defined with mating joints 311 at their mating ends for readily and convenient engagement.

In this third embodiment, the bottom wall 41", the first peripheral wall 42", the second peripheral wall 44" and the supporting platform 33" can be formed individually, and then assembled together, or they can be integrally formed together. It is noted that the lateral wall 31" of the bezel frame 30" is preferably formed separately.

From the above descriptions of the preferable embodiments, it can be readily appreciated that with the interengagement between the retaining tabs and the positioning slots between the bezel frame and the TFT substrate, the purpose and goal of the present invention can be properly achieved. Mostly importantly, the top surface of the display panel is flushed with the top surface of the bezel through this effective arrangement. Other benefits can be readily achieved as well.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

The invention claimed is:

1. An enclosure for mounting a liquid crystal display module, comprising:
    a bezel frame including a lateral wall and a bezel attached to the lateral wall, a retaining gap being defined under the bezel, at least one resilient tab extending into the retaining gap;
    a substrate having a leading edge defining with at least one positioning slot corresponding to the at least one resilient tab, and a display panel supported on the substrate;
    wherein the leading edge of the substrate is inserted into the retaining gap, and interengagement is created between a resilient tab of the at least one resilient tab and a positioning slot of the at least one positioning slot;
    wherein the resilient tab is configured by first and second prongs extending from the lateral wall of the bezel frame, the first and second prongs being separate and spaced from each other such that the first and second prongs are respectively and independently engageable with two opposite sidewalls of the positioning slot of the substrate to create the interengagement between the resilient tab and the positioning slot, and
    each of the first and second prongs forms an obtuse angle with a portion of lateral wall between the first and second prongs in a plan view, and the positioning slot has a dovetail shape.

2. The enclosure as recited in claim 1, wherein the leading edge is inserted into the retaining gap, and a top surface of the display panel is flushed with a top surface of the bezel.

3. The enclosure as recited in claim 1, wherein each of the first and second prongs is formed with a lead-in for insertion into the positioning slot of the substrate.

4. The enclosure as recited in claim 1, further comprising a base frame interengaged with the bezel frame.

5. The enclosure as recited in claim 4, wherein the bezel frame is formed with a mounting portion rooted into a trough defined in the base frame.

6. A liquid crystal display panel, comprising:
- an enclosure configured with a bezel frame which includes a lateral wall and a bezel extending from the lateral wall, wherein at least one resilient tab is formed on the lateral wall of the bezel frame;
- a substrate having a leading edge defining with at least one positioning slot corresponding to the at least one resilient tab, and a display panel module with optical components supported on the substrate;
- a space being defined under the bezel with the at least one resilient tab extending into the space; and
- wherein the leading edge of the substrate is inserted into the space, and interengagement is created between a resilient tab of the at least one resilient tab and a positioning slot of the at least one positioning slot;
- wherein the resilient tab is configured by first and second prongs extending from the lateral wall of the bezel frame, the first and second prongs being separate and spaced from each other such that the first and second prongs are respectively and independently engageable with two opposite sidewalls of the positioning slot of the substrate to create the interengagement between the resilient tab and the positioning slot, and
- each of the first and second prongs forms an obtuse angle with a portion of lateral wall between the first and second prongs in a plan view, and the positioning slot has a dovetail shape.

7. The liquid crystal display panel as recited in claim 6, wherein the bezel frame includes a supporting platform in the space under the bezel so as to define a retaining gap in which the resilient tab reaches therein.

8. The liquid crystal display panel as recited in claim 6, wherein the enclosure further includes a base frame assembled with the bezel frame, and the base frame has a supporting platform to jointly define a retaining gap with the bezel of the bezel frame.

9. The liquid crystal display panel as recited in claim 6, wherein each of the first and second prongs is provided with a lead-in.

\* \* \* \* \*